(12) United States Patent
Hayashi et al.

(10) Patent No.: US 7,471,431 B2
(45) Date of Patent: Dec. 30, 2008

(54) HOLOGRAM DEVICE AND HOLOGRAM RECORDING/REPRODUCING METHOD

(75) Inventors: Kunihiko Hayashi, Kanagawa (JP); Nobuhiro Kihara, Kanagawa (JP); Muneyasu Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 11/474,847

(22) Filed: Jun. 26, 2006

(65) Prior Publication Data
US 2007/0002715 A1 Jan. 4, 2007

(30) Foreign Application Priority Data
Jun. 29, 2005 (JP) ............................ 2005-189279

(51) Int. Cl.
*G03H 1/26* (2006.01)
(52) U.S. Cl. ................ 359/22; 359/3; 359/35; 359/900
(58) Field of Classification Search ................ 359/3
See application file for complete search history.

(56) References Cited

U.S. PATENT DOCUMENTS

2004/0067419 A1* 4/2004 Mizushima ................ 430/1
2008/0007808 A1* 1/2008 Ogasawara et al. ........... 359/30

* cited by examiner

*Primary Examiner*—Fayez G Assaf
(74) *Attorney, Agent, or Firm*—Wolf, Greenfield & Sacks, P.C.

(57) ABSTRACT

A hologram device records information of an interference fringe of signal light and reference light onto a hologram recording medium and reproduces the recorded information by emitting the reference light onto a recording area of the hologram recording medium. The hologram device includes a recording/reproducing controller performing a recording operation of the information concurrently with a reproducing operation of previously-recorded information, and an error detector detecting an error in the previously-recorded information reproduced concurrently with the recording operation.

9 Claims, 3 Drawing Sheets

HOLOGRAM DEVICE AND HOLOGRAM RECORDING/REPRODUCING METHOD

CROSS REFERENCES TO RELATED APPLICATIONS

The present invention contains subject matter related to Japanese Patent Application JP 2005-189279 filed in the Japanese Patent Office on Jun. 29, 2005, the entire contents of which are incorporated herein by reference.

BACKGROUND OF THE INVENTION

1. Field of the Invention

The present invention relates to a hologram recording/reproducing method for recording an interference fringe of two light beams onto a hologram recording medium and for reproducing data on the basis of light diffracted by the recorded interference fringe, and to a hologram device.

2. Description of the Related Art

In recent years, holographic technology has been developed rapidly towards practical application of a holographic memory, which is drawing much attention as a powerful candidate against optical discs of the next generation and the generation after that. Development of a holographic data storage system that performs recording and reproducing of large-volume data using the holographic technology has been proposed.

According to a hologram recording technique in related art, a recording operation is implemented by producing an interference fringe of reference light and signal light on a hologram recording medium and then recording the interference fringe on the hologram recording medium. In view of achieving practical application, a hologram recording device in related art may be problematic in that optical paths of the reference light and the signal light may change if the device vibrates during an exposure process or the interference fringe may change if the optical paths of the reference light and the signal light vibrate, thus inhibiting a proper recording operation. In a holographic memory for recording optical wavefront information, it is difficult to produce an interference fringe if the optical paths change by a tenth or more of the usable wavelength. In order to solve such problems, positioning control (servo) of a pickup unit having a high frequency response characteristic that can compensate for such vibration has been developed recently. However, unlike a typical optical recording technique where recording is performed in a bit-by-bit fashion, it is extremely difficult to implement positioning control in hologram recording while inhibiting aberration since holograms are generally for two-dimensional recording. Therefore, with hologram recording, simply increasing the frequency response characteristic of a pickup unit does not necessarily solve the abovementioned problems.

Meanwhile, if an error occurs in a typical optical disc, such as DVD (digital versatile disc) and BD (blue-ray disc), the error can be corrected by a signal processing technique or an error correcting technique. However, these optical discs are limited in that if an unexpected error occurs, at least the corresponding track entirely becomes defective. A typical data storage disc generally allows recording of one track at a time, which means that if such an error occurs, the whole disc may have to be discarded. This results in a waste of time and money for the recording media.

Hologram recording media have the same problems as current optical discs. This means that in a case where an error occurs, which may be not correctable by a signal processing technique or an error correcting technique, the hologram recording medium with the error may have to be discarded due to the same reason as above.

A typical example of a hologram multiplex-recording technique is an angular multiplexing technique in which an incident angle of reference light on a hologram recording medium is changed at high speed so as to record multiplex data onto a single book (for example, see Japanese Unexamined Patent Application Publication No. 2003-337524, p. 11, FIG. 5). Therefore, a large dynamic range may be necessary in hologram recording media, and in order to achieve this, an expensive material, such as a photopolymer, is used for the hologram recording media, which may lead to higher costs in comparison to typical optical discs. It is therefore highly desirable to prevent discarding of expensive media as a result of an error described above.

SUMMARY OF THE INVENTION

Hologram recording is easily affected by vibration, which may induce a writing error. Moreover, since hologram recording is performed three-dimensionally, a large volume of data is recorded onto a recording area of a hologram recording medium at a time in the form of, for example, a data page. Although an error in a data page can be corrected by a signal processing technique or an error correcting technique, it is difficult to record the data page itself if the recording operation is affected by, for example, vibration. This makes the error correction difficult, which implies that if an error occurs, there is a high possibility that the expensive hologram recording medium may have to be discarded entirely. An incapability to solve such problems may lead to lower hologram recording efficiencies, thus resulting in higher costs.

It is desirable to provide a hologram recording/reproducing method which prevents discarding of a whole medium as a result of a writing error. In addition, it is also desirable to provide a hologram device which uses this method.

A hologram device according to an embodiment of the present invention records information of an interference fringe of signal light and reference light onto a hologram recording medium and reproduces the recorded information by emitting the reference light onto a recording area of the hologram recording medium. The device includes a recording/reproducing controller performing a recording operation of the information concurrently with a reproducing operation of previously-recorded information, and an error detector detecting an error in the previously-recorded information reproduced concurrently with the recording operation.

Furthermore, when the information is recorded onto the hologram recording medium, the recording/reproducing controller may control an emission of the reference light to the hologram recording medium in a manner such that an incident area of the reference light covers an incident area of the signal light on the hologram recording medium and also covers a previous recording area having the previously-recorded information so as to reproduce the previously-recorded information from the previous recording area.

As described above, according to the embodiment of the present invention, when the information is recorded onto the hologram recording medium, the incident area of the reference light covers the incident area of the signal light on the hologram recording medium and also covers the previous recording area having the previously-recorded information. Thus, the interference fringe of the reference light and the signal light is recorded onto a current recording area concurrently with generation of reproduction light from the previous recording area. The reproduction light is guided to an image-capturing unit where the data is reproduced. The reproduced data is compared with record data corresponding to the reproduced data so as to detect whether the reproduced data has an error. If the reproduced data is determined to have an error, the corresponding record data is recorded onto a new recording area in a subsequent recording cycle. Therefore, even when an error occurs during a recording operation, the corresponding data can be re-recorded, thereby preventing the whole recording medium from being discarded as a result of a writing error. Accordingly, this allows a hologram recording operation to be performed efficiently and economically, thereby contributing to reduction of recording costs.

DESCRIPTION OF THE PREFERRED EMBODIMENTS

When information is recorded onto a hologram recording medium, an incident area of reference light covers an incident area of signal light on the hologram recording medium and also covers a previous recording area having previously-recorded information. Thus, an interference fringe of the reference light and the signal light is recorded onto a current recording area concurrently with reproduction of data from the previous recording area. It is then detected whether the reproduced data has an error. If the reproduced data is determined to have an error, record data corresponding to the reproduced data is recorded onto a new recording area in a subsequent recording cycle. Accordingly, this prevents the whole recording medium from being discarded as a result of a hologram writing error.

First Embodiment

Figure 1:
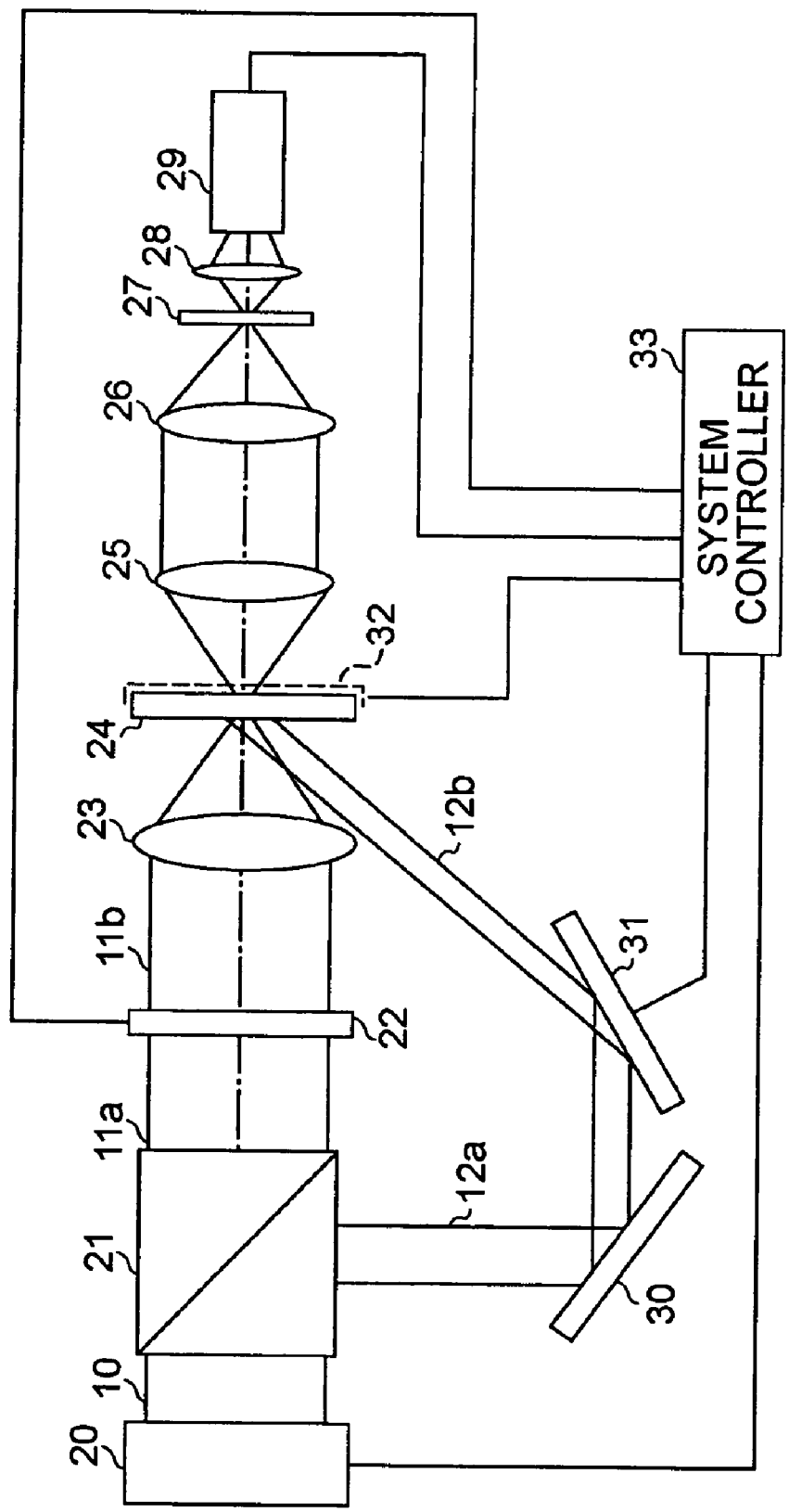
FIG. 1 is a block diagram of a hologram device according to a first embodiment of the present invention.

FIG. 1 is a block diagram of a hologram device according to a first embodiment of the present invention. The hologram device includes a laser light source 20, a polarizing beam splitter (PBS) 21, a spatial modulator 22, a signal-light lens 23, a hologram recording medium 24, reproduction-light lenses 25 and 26, a diaphragm 27, a lens 28, an image-capturing unit 29, a path-changing mirror 30, an angle-adjustable mirror 31, a stage 32 for moving the hologram recording medium 24, and a system controller 33 that performs a data recording/reproducing operation and an error inspection of recorded data. Thus, the hologram device records data onto and reproduces data from the hologram recording medium 24.

An operation of the hologram device according to the first embodiment will be described below. When performing a recording operation, the laser light source 20 emits a laser beam 10, which is split into a P-wave 11a and an S-wave 12a by the PBS 21. The laser light source 20 is generally a type that generates light on a wavelength near the visible light range. The P-wave 11a passes through a shutter, not shown, and enters the spatial modulator 22 where the P-wave 11a is subject to spatial modulation in accordance with a data page displayed on the spatial modulator 22 so as to become signal light 11b. The spatial modulator 22 is generally defined by a transmissive liquid crystal display panel or a reflective liquid crystal display panel, or may be defined by a unit used in an image formation device, such as a digital micromirror device (DMD) and a grating light valve (GLV). The signal light 11b is focused onto a recording area of the hologram recording medium 24 by the signal-light lens 23. The hologram recording medium 24 does not necessarily have to be perpendicular to the optical axis of the signal light 11b.

Figure 2:
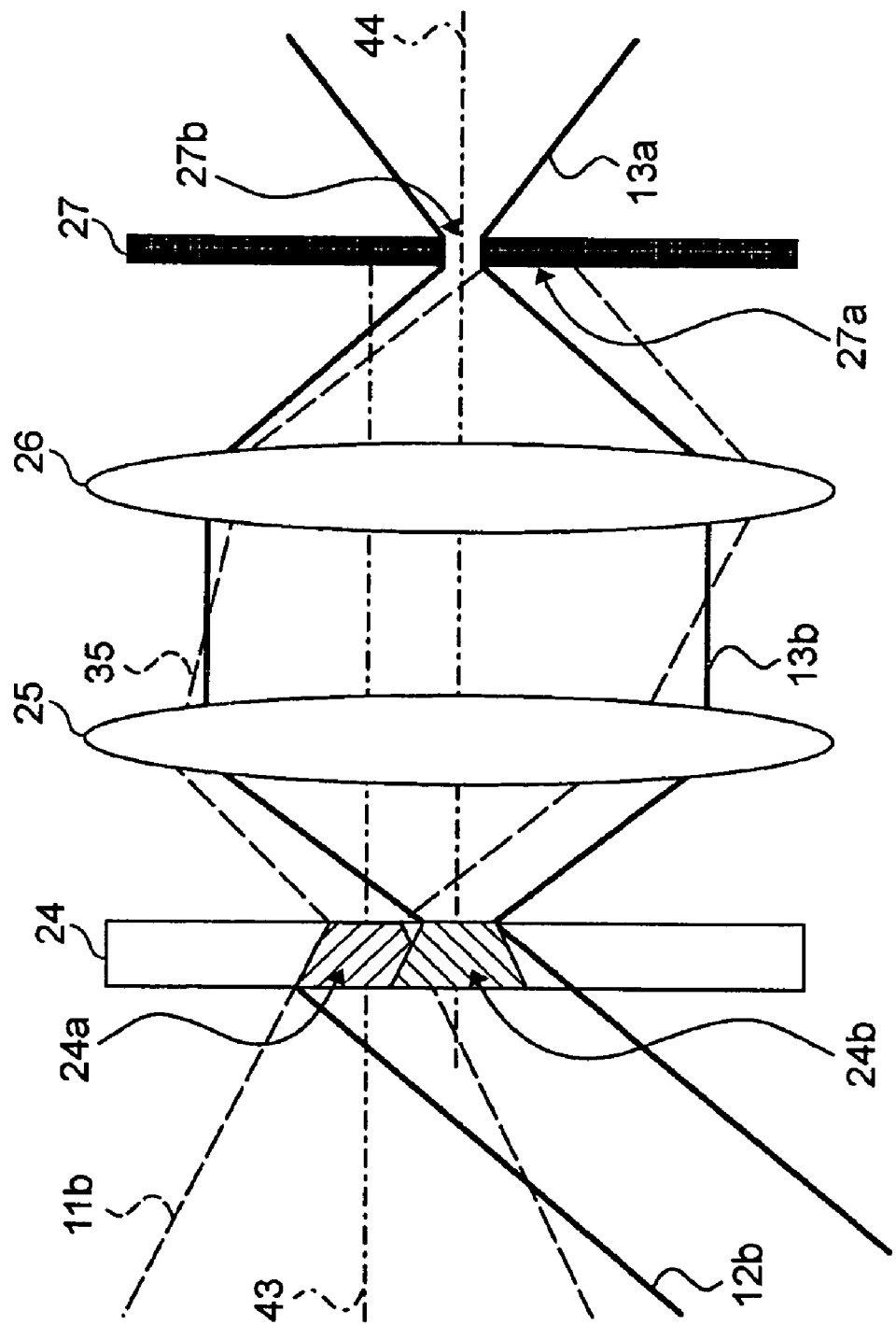
FIG. 2 schematically shows hologram recording and reproducing operations concurrently performed by the device shown in FIG. 1.

On the other hand, with regard to the S-wave 12a, the path thereof is changed by the path-changing mirror 30. Subsequently, the S-wave 12a enters the angle-adjustable mirror 31 as reference light 12b. The angle of the angle-adjustable mirror 31 is adjustably controlled by the system controller 33, such that the angle-adjustable mirror 31 sets an incident angle of the reference light 12b on the hologram recording medium 24. Referring to FIG. 2, the reference light 12b with the set incident angle is emitted towards the hologram recording medium 24 in a manner such that the reference light 12b covers an incident area (corresponding to a recording area 24a) of the signal light 11b on the hologram recording medium 24 and a last recording area 24b having information last-recorded (or most recently recorded) thereon. In other words, as shown in FIG. 2, the incident area of the reference light 12b on the hologram recording medium 24 is wide enough to cover both the current recording area 24a and the last recording area 24b having the last-recorded information.

Consequently, the signal light 11b and the reference light 12b interfere with each other at the recording area 24a of the hologram recording medium 24, and the interference information is recorded onto the recording area 24a. At the same time, the reference light 12b is incident also on the recording area 24b, whereby diffracted light 13b is generated. The diffracted light 13b passes through the reproduction-light lenses 25 and 26 constituting a 4f system and travels towards the diaphragm 27. The diffracted light 13b then enters a diaphragm aperture 27b provided in the diaphragm 27 and passes through the diaphragm aperture 27b so as to become reproduction light 13a.

On the other hand, transmission light 35 of the signal light 11b is generated from the recording area 24a. The transmission light 35 passes through the reproduction-light lenses 25 and 26 constituting the 4f system and travels towards the diaphragm 27. However, since the transmission light 35 and the diffracted light 13b are not aligned with each other at their generated positions, an optical axis 43 of the transmission light 35 and an optical axis 44 of the diffracted light 13b are misaligned with each other. Due to the misalignment, the transmission light 35 is emitted to a section 27a on the diaphragm 27 but does not enter the diaphragm aperture 27b. Thus, the transmission light 35 is blocked by the diaphragm 27. Consequently, the reproduction light 13a is focused onto the image-capturing unit 29 via the lens 28 without being mixed with the transmission light 35 generated during recording, and is photo-electrically converted by the image-capturing unit 29 to become reproduction data. In other words, in concurrence with a data recording operation, the last-recorded data in the last recording area is reproduced without, for example, S/N deterioration.

The data reproduced concurrently with the recording operation is compared with corresponding record data so as to detect whether the reproduced data has an error. If the reproduced data has an error, the error information is written into a predetermined area and the corresponding record data is re-recorded onto a new recording area in a subsequent recording cycle.

Figure 3:
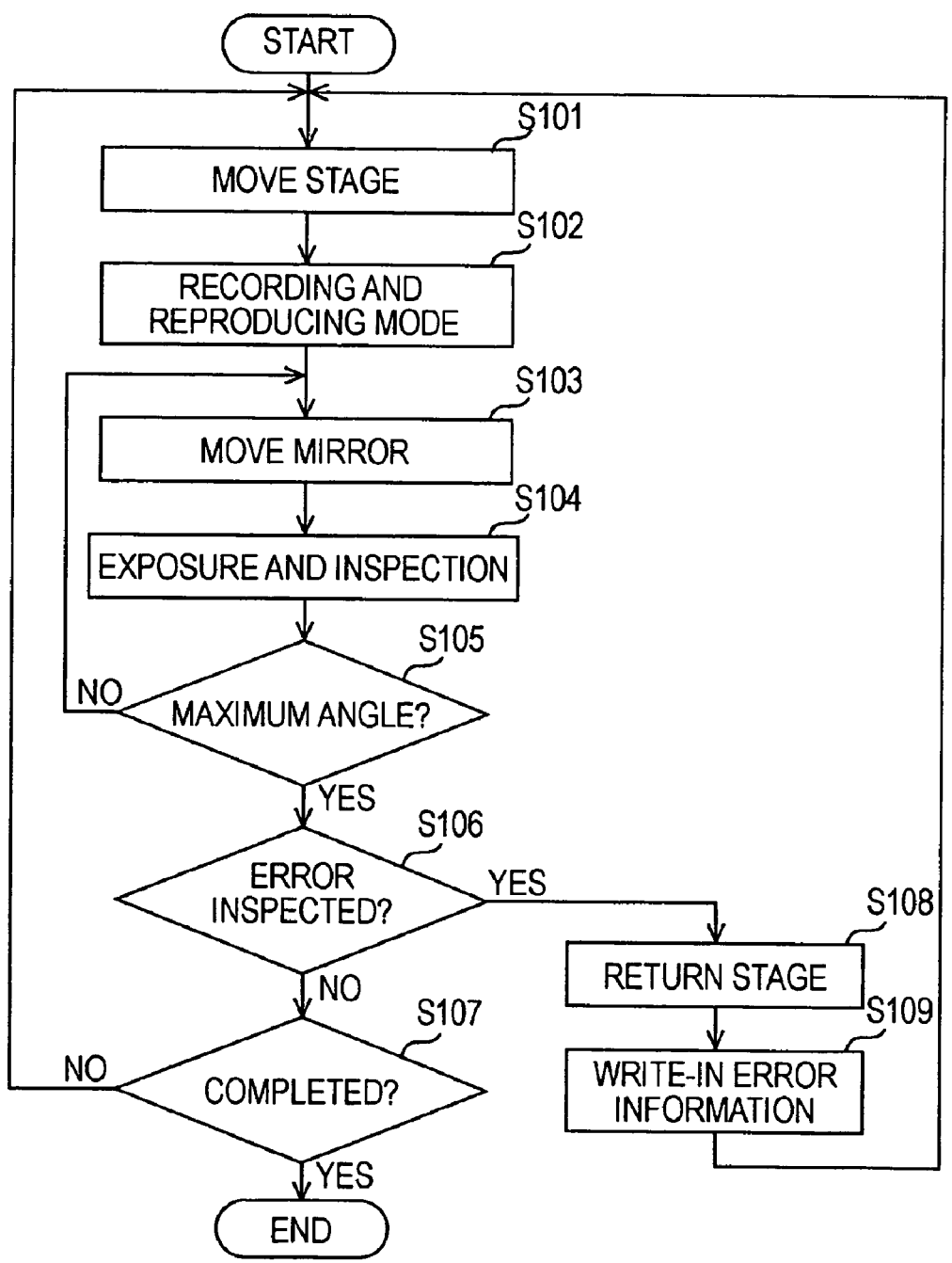
FIG. 3 is a flow chart of a control operation performed by a system controller shown in FIG. 1.

FIG. 3 is a flow chart of a control operation performed by the system controller 33. In step S101, the system controller 33 controls the stage 32 in order to move the hologram recording medium 24. In step S102, the hologram device is switched to a recording-and-reproducing mode so that a hologram recording operation is implemented on a predetermined recording area (book), such as the recording area 24a. In step S103, the system controller 33 adjusts the angle of the angle-adjustable mirror 31, and performs switching of a data pattern displayed on the spatial modulator 22. In step S104, the system controller 33 adjusts an intensity ratio between the signal light 11b and the reference light 12b in accordance with a schedule and performs an exposure process so as to implement data recording. Concurrently, the system controller 33 reproduces last-recorded data from the last recording area and performs an inspection to determine whether the reproduced data has an error. In step S105, it is determined whether an incident angle between a normal vector of the recording areas and an incidence vector of the reference light 12b has reached a maximum angle in response to the angle adjustment of the angle-adjustable mirror 31. If the incident angle has reached its maximum, the operation proceeds to step S106. If not, the operation returns to step S103. By repeating the cycle from step S103 to step S104, data is sequentially multiplex-recorded onto one book at a time while the multiplexed data in the last-recorded book is read out so that the data can be inspected for errors. This inspection process is implemented by comparing the reproduced data with preliminarily recorded data.

In step S106, it is determined whether the multiplexed data in the last-recorded book has an error. If there is no error, the operation proceeds to step S107 where it is determined whether or not the data recording on the hologram recording medium 24 is completed. If it is determined in step S107 that the data recording is not completed, the operation returns to step S101, whereas if it is determined in step S107 that the data recording is completed, the recording/reproducing operation is completed. On the other hand, if it is determined in step S106 that the reproduced data has an error, the operation proceeds to step S108 where the stage 32 is controlled so as to return to the recording position of the hologram recording medium 24. Subsequently, in step S109, the error information is written into the hologram recording medium 24. The operation then returns to step S101 so as to start a process for writing the data determined to be an error onto a new book in the same manner as described above.

According to the first embodiment, when a hologram recording operation is to be performed using an angular multiplexing technique, an incident area of reference light is broadened so as to allow an interference fringe of the reference light and signal light to be recorded onto a current recording area and also to allow the reference light to be emitted to a last recording area having data last-recorded thereon. Thus, the data on the last recording area can be reproduced and be inspected for errors. Consequently, in concurrence with performing multiplex-recording of data sequentially onto one book at a time, the last-recorded data is sequentially read out from the last-recorded book so that an error inspection can be performed on the read data. This means that if even one of the read data items has an error, the data item with the error is immediately recorded onto a new book. Therefore, even when the recording is defective, it is only necessary to mend one book. This implies that if a recording operation were to be performed in an environment where a writing error may likely to occur due to, for example, vibration, the whole recording medium is prevented from being discarded as a result of a writing error. Moreover, since recording of the current data, reproduction of the last-recorded data, and an error inspection of the reproduced data are performed at the same time, an additional time for the error inspection of the reproduced data is not necessary. Accordingly, the above advantages can be achieved without adversely affecting the recording speed.

The technical scope of the present invention is not limited to the above embodiment, and modifications are permissible within the scope and spirit of the present invention. In the above embodiment, in concurrence with recording of information onto a current recording area, last-recorded information is reproduced from a last recording area. As an alternative to reproducing the last-recorded information from the last recording area, information from a second-to-last recording area prior to the last recording area, information from a third-to-last recording area prior to the second-to-last recording area, or information from an n-th-to-last recording area prior to an (n−1)th-to-last recording area may be reproduced. Furthermore, although the above embodiment is directed to an example of a hologram device that is based on an angular multiplexing technique, the same advantages as above can be achieved by applying the above embodiment to a hologram device that performs hologram recording/reproducing based on other multiplexing techniques, such as shift multiplexing and speckle multiplexing techniques.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram device which records information of an interference fringe of signal light and reference light onto a hologram recording medium and which reproduces the recorded information by emitting the reference light onto a recording area of the hologram recording medium, the device comprising:
   recording/reproducing controlling means performing a recording operation of the information concurrently with a reproducing operation of previously-recorded information; and
   error detecting means detecting an error in the previously-recorded information reproduced concurrently with the recording operation.

2. The hologram device according to claim 1, wherein when the information is recorded onto the hologram recording medium, the recording/reproducing controlling means controls an emission of the reference light to the hologram recording medium in a manner such that an incident area of the reference light covers an incident area of the signal light on the hologram recording medium and also covers a previous recording area having the previously-recorded information so as to reproduce the previously-recorded information from the previous recording area.

3. The hologram device according to claim 1, wherein the recording/reproducing controlling means includes separating means configured to separate transmission light of the signal light transmitted through the hologram recording medium from reproduction light generated from the previous recording area having the previously-recorded information so as to guide only the reproduction light towards a photoelectric conversion element.

4. The hologram device according to claim 3, wherein the separating means includes a diaphragm disposed at a position where a current recording area on the hologram recording medium and the previous recording area having the previously-recorded information forms a mirror-image relationship.

5. The hologram device according to any one of claims 1-4, wherein the error detecting means detects an error by comparing the reproduced information with record information corresponding to the reproduced information.

6. The hologram device according to any one of claims 1-4, wherein if an error is detected, the recording/reproducing controlling means records the corresponding record information onto a new recording area.

7. The hologram device according to any one of claims 1-4, wherein the previous recording area includes an area having information recorded thereon in one or more recording cycles prior to a current recording cycle, the information being reproduced concurrently with the current recording cycle.

8. A hologram recording/reproducing method for recording information of an interference fringe of signal light and reference light onto a hologram recording medium and for reproducing the recorded information by emitting the reference light onto a recording area of the hologram recording medium, the method comprising the step of:

performing a recording operation of the information concurrently with a reproducing operation of previously-recorded information, and detecting whether the reproduced information has an error, wherein if an error is detected in the reproduced information, record information corresponding to the reproduced information determined to have an error is recorded onto a new recording area in a subsequent recording cycle.

9. A hologram device which records information of an interference fringe of signal light and reference light onto a hologram recording medium and which reproduces the recorded information by emitting the reference light onto a recording area of the hologram recording medium, the device comprising:

a recording/reproducing controller performing a recording operation of the information concurrently with a reproducing operation of previously-recorded information; and an error detector detecting an error in the previously-recorded information reproduced concurrently with the recording operation.

* * * * *